(12) United States Patent
Hashimura et al.

(10) Patent No.: US 11,148,719 B2
(45) Date of Patent: Oct. 19, 2021

(54) BUMPER SYSTEM

(71) Applicant: KOBE STEEL, LTD., Hyogo (JP)

(72) Inventors: Toru Hashimura, Kobe (JP); Taiki Yamakawa, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 39 days.

(21) Appl. No.: 16/642,062

(22) PCT Filed: Jul. 24, 2018

(86) PCT No.: PCT/JP2018/027716
§ 371 (c)(1),
(2) Date: Feb. 26, 2020

(87) PCT Pub. No.: WO2019/049536
PCT Pub. Date: Mar. 14, 2019

(65) Prior Publication Data
US 2021/0016832 A1 Jan. 21, 2021

(30) Foreign Application Priority Data
Sep. 5, 2017 (JP) .............................. JP2017-170462

(51) Int. Cl.
B62D 21/15 (2006.01)
B60R 19/24 (2006.01)
B60R 19/18 (2006.01)

(52) U.S. Cl.
CPC .............. *B62D 21/15* (2013.01); *B60R 19/18* (2013.01); *B60R 19/24* (2013.01); *B60R 2019/1806* (2013.01)

(58) Field of Classification Search
CPC ......... B62D 21/15; B60R 19/18; B60R 19/24; B60R 2019/1806
See application file for complete search history.

(56) References Cited

U.S. PATENT DOCUMENTS

2009/0243314 A1 10/2009 Hashimoto et al.
2012/0267908 A1 10/2012 Kokubo et al.
(Continued)

FOREIGN PATENT DOCUMENTS

JP 2006-096229 A 4/2006
JP 2009-241869 A 10/2009
(Continued)

OTHER PUBLICATIONS

The extended European search report issued by the European Patent Office dated Dec. 17, 2020, which corresponds to European Patent Application No. 18852948.1-1132 and is related to U.S. Appl. No. 16/642,062.
(Continued)

*Primary Examiner* — D Glenn Dayoan
*Assistant Examiner* — Melissa Ann Bonifazi
(74) *Attorney, Agent, or Firm* — Studebaker & Brackett PC

(57) ABSTRACT

In a bumper system, one end portion of a first tube is inserted into first beam holes, and the other end portion of the first tube is inserted into a first plate hole, one end portion of a second tube is inserted into second beam holes, and the other end portion of the second tube is inserted into a second plate hole. The bumper stay is joined to a bumper beam and a vehicle body plate by press-fitting in a state in which the first tube is expanded at the holes and the second tube is expanded at the holes. A first connection rib is in contact with the bumper beam, and a second connection rib is in contact with the vehicle body plate in the same direction as a direction in which the first connection rib is in contact with the bumper beam.

6 Claims, 20 Drawing Sheets

(56) References Cited

U.S. PATENT DOCUMENTS

| | | |
|---|---|---|
| 2014/0008936 A1 | 1/2014 | Kim et al. |
| 2016/0129866 A1 | 5/2016 | Kamiya |
| 2017/0106909 A1 | 4/2017 | Daido et al. |
| 2018/0015527 A1 | 1/2018 | Maeda et al. |
| 2019/0210088 A1 | 7/2019 | Maeda et al. |
| 2019/0210089 A1 | 7/2019 | Maeda et al. |
| 2019/0375355 A1 | 12/2019 | Maeda et al. |

FOREIGN PATENT DOCUMENTS

| | | |
|---|---|---|
| JP | 2010-006193 A | 1/2010 |
| JP | 2011-105302 A | 6/2011 |
| WO | 2014/196093 A1 | 12/2014 |

OTHER PUBLICATIONS

International Preliminary Report on Patentability and Written Opinion issued in PCT/JP2018/027716; dated Mar. 19, 2020.
International Search Report issued in PCT/JP2018/027716; dated Oct. 23, 2018.

BUMPER SYSTEM

CROSS-REFERENCE TO RELATED APPLICATIONS

This is a national phase application in the United States of International Patent Application No. PCT/JP2018/027716 with an international filing date of Jul. 24, 2018, which claims priority of Japanese Patent Application No. 2017-170462 filed on Sep. 5, 2017 the contents of which are incorporated herein by reference.

TECHNICAL FIELD

The present invention relates to a bumper system.

BACKGROUND ART

In order to reduce the weight of automobiles and improve safety thereof, a metal having low specific gravity and high strength, which is called high-tension steel, is used. High-tension steel is effective in reducing weight and improving safety, but is heavier than other low specific gravity materials such as aluminum alloys. Further, in a case where high-tension steel is used, problems, such as a decrease in formability, an increase in forming load, and a decrease in dimensional accuracy, arise due to high strength. In order to solve those problems, in recent years, extruded materials, cast products, and press-formed products of aluminum alloys having specific gravity lower than that of steel have been used for vehicle parts. Aluminum alloys have low specific gravity, and are therefore effective in reducing weight, but have low strength. Therefore, multi-materialization has been used by combining steel parts made from high-tension steel or the like and aluminum alloy parts.

A problem caused by multi-materializaition is to join dissimilar metals such as steel parts and aluminum alloy parts, and various joining methods have been proposed. For example, JP 2016-147309 A discloses a method for joining members, which is capable of joining dissimilar metals in multi-materialization by using an elastic body. Specifically, in the method for joining members in JP 2016-147309 A, an aluminum pipe is inserted into a hole of a steel part, and rubber (elastic body) is inserted into the aluminum pipe, and then the rubber is pressurized to deform the rubber, thereby enlarging and deforming the aluminum pipe to join the steel part and the aluminum pipe by press-fitting.

A bumper system, which is one of vehicle parts, is formed by joining a bumper stay to a bumper beam and a vehicle body plate. In particular, it is possible to provide a multi-materialized bumper system by applying the method for joining members in JP 2016-147309 A to the bumper system.

SUMMARY OF THE INVENTION

Although the method disclosed in JP 2016-147309 A can achieve multi-materialization, joining strength may be lower than other joining methods such as welding, as a result of comparison of joining the same kind of metals. In a case where sufficient joining strength is not ensured and when a partial load applied at the time of offset collision is applied to the bumper system, the bumper stay may fall sideways or penetrate the bumper beam and the vehicle body plate. When such a sideway fall or penetration occurs, a necessary load resistance required for the bumper system cannot be ensured.

An object of the present invention is to provide a bumper system that prevents a bumper stay from falling sideways or penetrating.

The present invention provides a bumper system including: a bumper stay in which a first tube and a second tube extending in the same direction are connected by a first connection rib provided at least at one end portion and a second connection rib provided at least at the other end portion; a bumper beam having a first beam hole into which one end portion of the first tube is insertable and a second beam hole into which one end portion of the second tube is insertable; and a vehicle body plate having a first plate hole into which the other end portion of the first tube is insertable and a second plate hole into which the other end portion of the second tube is insertable, in which: the bumper system is a system in which the bumper stay and the bumper beam are joined and the bumper stay and the vehicle body plate are joined; the one end portion of the first tube is inserted into the first beam hole, the other end portion of the first tube is inserted into the first plate hole, the one end portion of the second tube is inserted into the second beam hole, and the other end portion of the second tube is inserted into the second plate hole; the bumper stay is joined to the bumper beam and the vehicle body plate by press-fitting in a state in which the first tube is expanded at both the first beam hole and the first plate hole and the second tube is expanded at both the second beam hole and the second plate hole; and the first connection rib is in contact with the bumper beam, and the second connection rib is in contact with the vehicle body plate in the same direction as a direction in which the first connection rib is in contact with the bumper beam in a direction in which the first tube and the second tube extend.

According to this configuration, the first connection rib is in contact with the bumper beam at one end portion of the bumper stay, and the second connection rib is in contact with the vehicle body plate at the other end portion of the bumper stay. Therefore, the first connection rib and the second connection rib support the bumper stay against a sideways fall. This can prevent the bumper stay from falling sideways. Herein, the one end portion means a portion from one end to about half in an axial direction of the bumper stay, and the other end portion means a portion from the other end to about half thereof.

Further, the first connection rib and the second connection rib are in contact with the bumper beam and the vehicle body plate, respectively, in the same direction, and therefore serve as a catch when the first tube and the second tube penetrate in the contact direction. In particular, in the bumper system, a direction to prevent penetration is generally determined because of a structure thereof. Thus, by providing the catches for preventing penetration in one direction as described above, the penetration can be efficiently prevented. In this way, it is possible to provide a highly safe bumper system that prevents a bumper stay from falling sideways or penetrating and ensures a necessary load resistance.

The vehicle body plate includes a plate slit that connects the first beam hole and the second beam hole and is cut out in a shape into which the first connection rib is insertable.

According to this configuration, when the bumper system is manufactured, first, the one end portion of the first tube is inserted into the first plate hole, and the one end portion of the second tube is inserted into the second plate hole. At this time, because the first connection rib provided at the one end portion of the bumper stay can pass through the plate slit, the bumper stay can be inserted into the vehicle body plate to the other end portion thereof. Then, the second connection rib provided at the other end portion of the bumper stay is brought into contact with the vehicle body plate. Next, the one end portion of the first tube is inserted into the first beam hole, and the one end portion of the second tube is inserted into the second beam hole, and thus the first connection rib is brought into contact with the bumper beam. In this state, the first tube is expanded at both the first beam hole and the first plate hole, and the second tube is expanded at both the second beam hole and the second plate hole. With this, the bumper stay can be joined to both the bumper beam and the vehicle body plate by press-fitting. Thus, the bumper system can be formed. Thus, it is possible to achieve a bumper system that is easily manufactured at a low cost, without performing special processing such as welding.

The bumper beam includes a beam slit that connects the first plate hole and the second plate hole and is cut out in a shape into which the second connection rib is insertable.

According to this configuration, when the bumper system is manufactured, first, the other end portion of the first tube is inserted into the first beam hole, and the other end portion of the second tube is inserted into the second beam hole. At this time, because the second connection rib provided at the other end portion of the bumper stay can pass through the beam slit, the bumper stay can be inserted into the bumper beam to the one end portion thereof. Then, the first connection rib provided at the one end portion of the bumper stay is brought into contact with the bumper beam. Next, the other end portion of the first tube is inserted into the first plate hole of the vehicle body plate, and the other end portion of the second tube is inserted into the second plate hole, and thus the second connection rib is brought into contact with the vehicle body plate. In this state, the first tube is expanded at both the first beam hole and the first plate hole, and the second tube is expanded at both the second beam hole and the second plate hole. With this, the bumper stay can be joined to both the bumper beam and the vehicle body plate by press-fitting. Thus, the bumper system can be formed. Thus, it is possible to achieve a bumper system that is easily manufactured at a low cost, without performing special processing such as welding.

At least one of the first connection rib and the second connection rib may be connected to the first tube and the second tube by welding.

According to this configuration, at least one of the first connection rib and the second connection rib can be additionally formed by welding after the bumper system is assembled. This can improve the degree of freedom in assembling the bumper system.

According to the present invention, by providing a first connection rib and a second connection rib, it is possible to provide a bumper system that prevents a bumper stay from falling sideways or penetrating.

MODE FOR CARRYING OUT THE INVENTION

Hereinafter, embodiments of the present invention will be described with reference to the accompanying drawings. The embodiments relate to a bumper system 1 in which a bumper stay 10 is joined to both a bumper beam 20 and a vehicle body plate 30. In each embodiment described below, materials of the bumper stay 10, the bumper beam 20, and the vehicle body plate 30 are not particularly limited to those illustrated, and may be arbitrary materials.

First Embodiment

Figure 1:
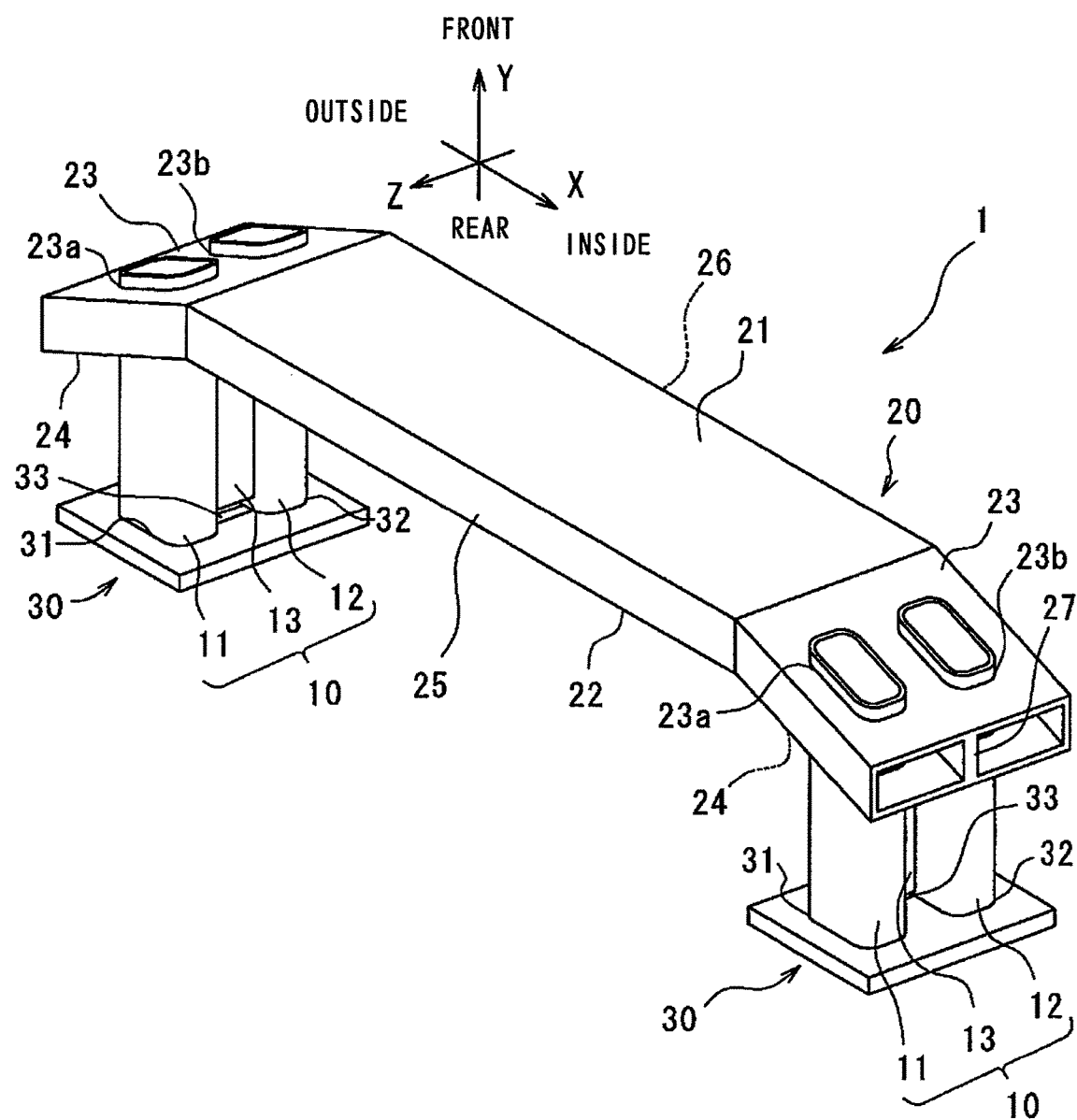
FIG. 1 is a perspective view of a bumper system according to a first embodiment of the present invention.

As shown in FIG. 1, the bumper stay 10 is a member that connects the bumper beam 20 and the vehicle body plate 30 described below. In this embodiment, two bumper stays 10 having the same shape connect one bumper beam 20 and two vehicle body plates 30. Hereinafter, a direction in which the bumper beam 20 extends (X direction in FIG. 1) may be referred to as a width direction of a vehicle, a direction in which the bumper stay 10 extends (Y direction in FIG. 1) may be referred to as a longitudinal direction of the vehicle, and a direction orthogonal to those directions (Z direction in FIG. 1) may be referred to as a height direction of the vehicle.

Figure 2:
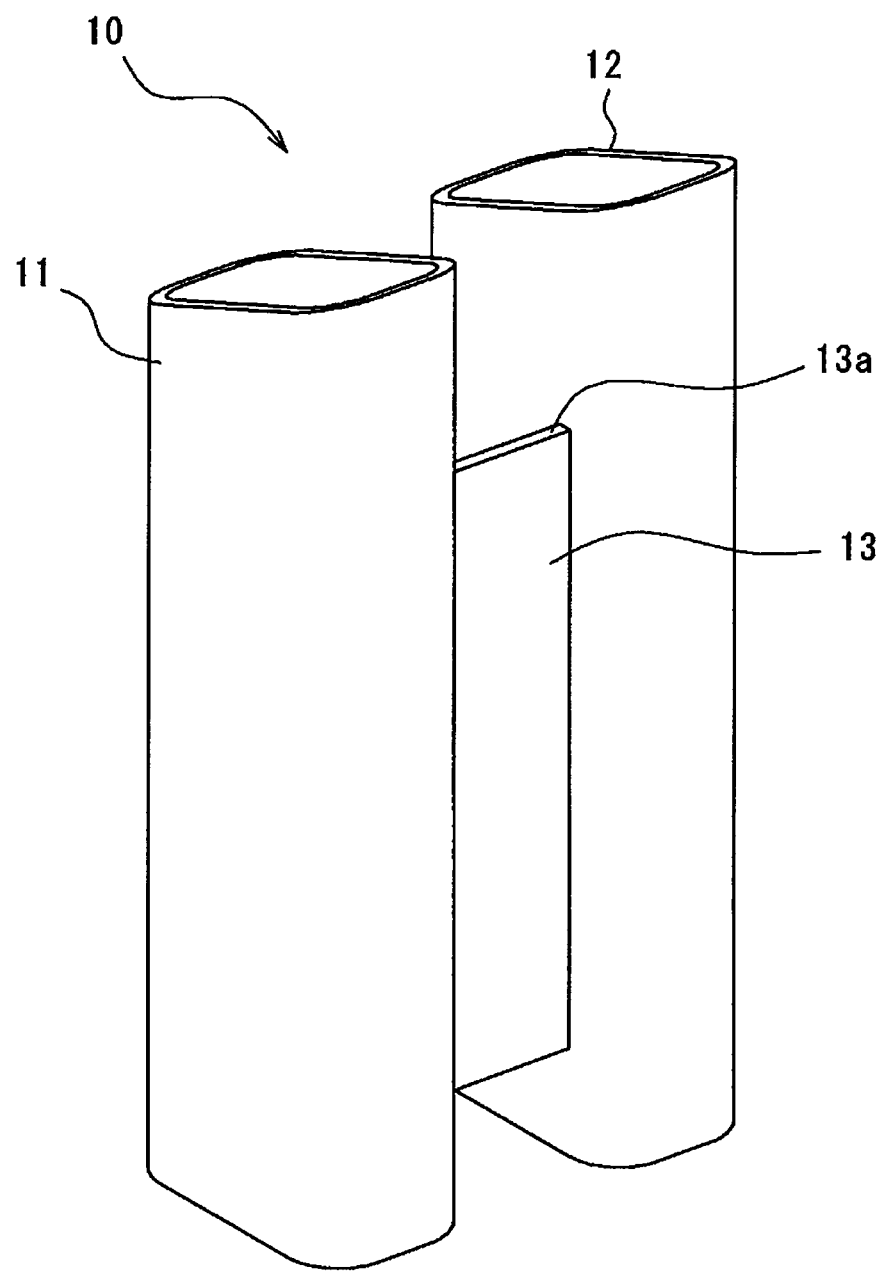
FIG. 2 is a perspective view of a bumper stay, which is seen from inside in a width direction of a vehicle.
Figure 3:
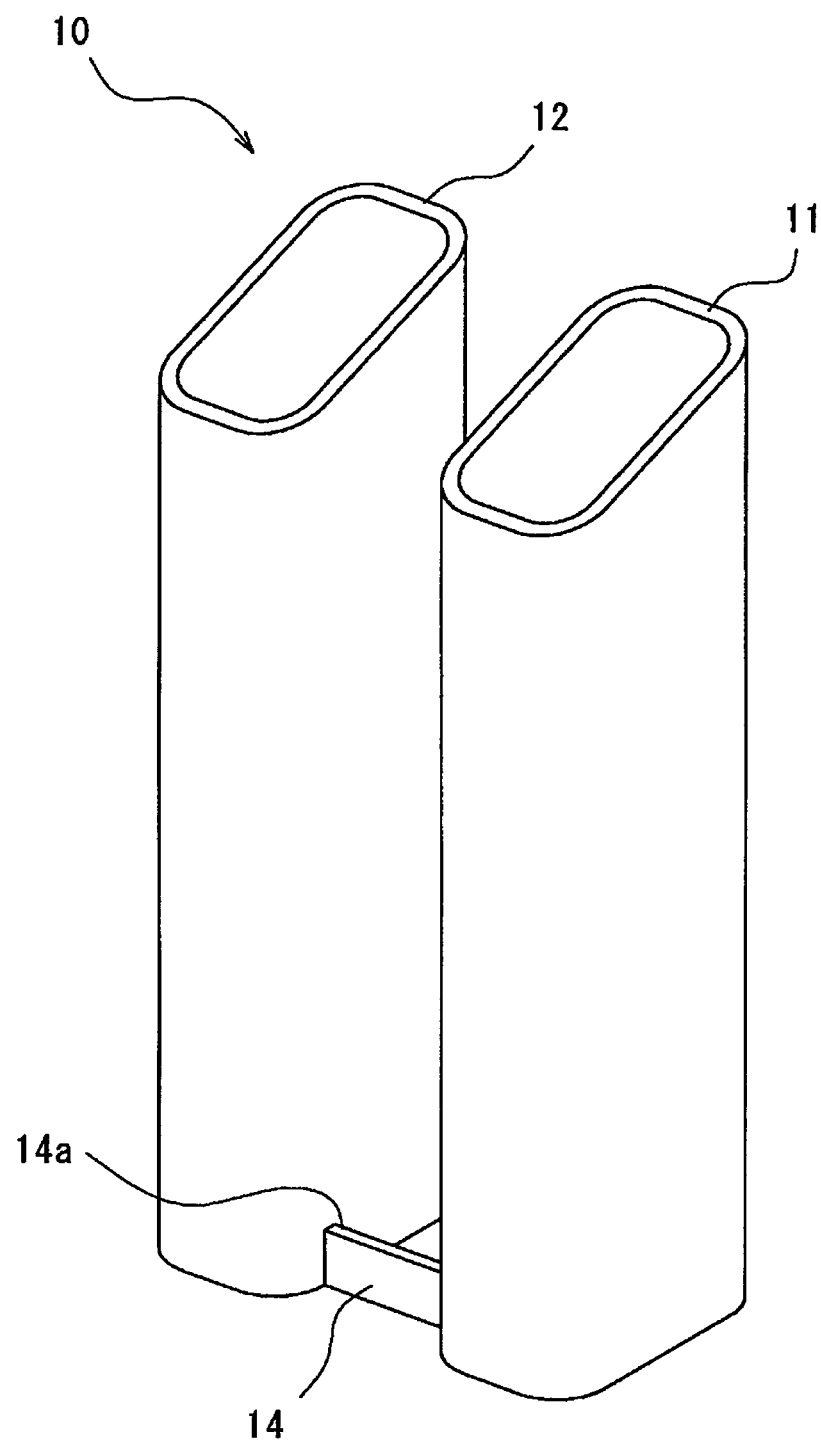
FIG. 3 is a perspective view of a bumper stay, which is seen from outside in a width direction of a vehicle.

As shown in FIGS. 2 and 3, the bumper stay 10 is formed so that a first tube 11 and a second tube 12 extending in the longitudinal direction of the vehicle are connected by a first connection rib 13 (see FIG. 2) provided at one end portion and a second connection rib 14 (see FIG. 3) provided at the other end portion. In this embodiment, the first tube 11 and the second tube 12 have the same shape extending in a coaxial direction, and are substantially rectangular tubes. One end portion (upper end portion in FIGS. 2 and 3) of the bumper stay 10 to be connected to the bumper beam 20 is cut in accordance with inclination of the bumper beam 20, whereas the other end portion thereof to be connected to the vehicle body plate 30 (lower end portion in FIGS. 2 and 3) has a flat surface perpendicular to a tube axis direction. Herein, the one end portion indicates a portion to about front half in the longitudinal direction of the vehicle, and the other end portion indicates a portion to about rear half in the longitudinal direction of the vehicle. Thus, specifically, in this embodiment, the first connection rib 13 is provided from the one end portion to the other end portion, and the second connection rib 14 is provided only at the other end portion.

Referring also to FIG. 1, the first connection rib 13 is a plate-like portion extending in the longitudinal direction of the vehicle (Y direction in FIG. 1) between the first tube 11 and the second tube 12. The first connection rib 13 is provided from the one end portion to the other end portion of the bumper stay 10 as described above, but is not provided at both ends of the bumper stay 10. That is, the first connection rib 13 is provided at the center of the bumper stay 10 in the longitudinal direction of the vehicle (Y direction in FIG. 1). The first connection rib 13 has a flat stop surface 13a to be brought into contact with the bumper beam 20 at the one end portion of the bumper stay 10.

The second connection rib 14 is a plate-like portion between the first tube 11 and the second tube 12. The second connection rib 14 is provided outside the first connection rib 13 in the width direction of the vehicle (X direction in FIG. 1), and is formed in parallel with the first connection rib 13. The second connection rib 14 has a flat stop surface 14a to be brought into contact with the vehicle body plate 30 at the other end portion of the bumper stay 10.

The bumper stay 10 described above may be an extruded material made from, for example, an aluminum alloy. Thus, the first tube 11, the second tube 12, the first connection rib 13, and the second connection rib 14 can be integrally formed.

Figure 4:
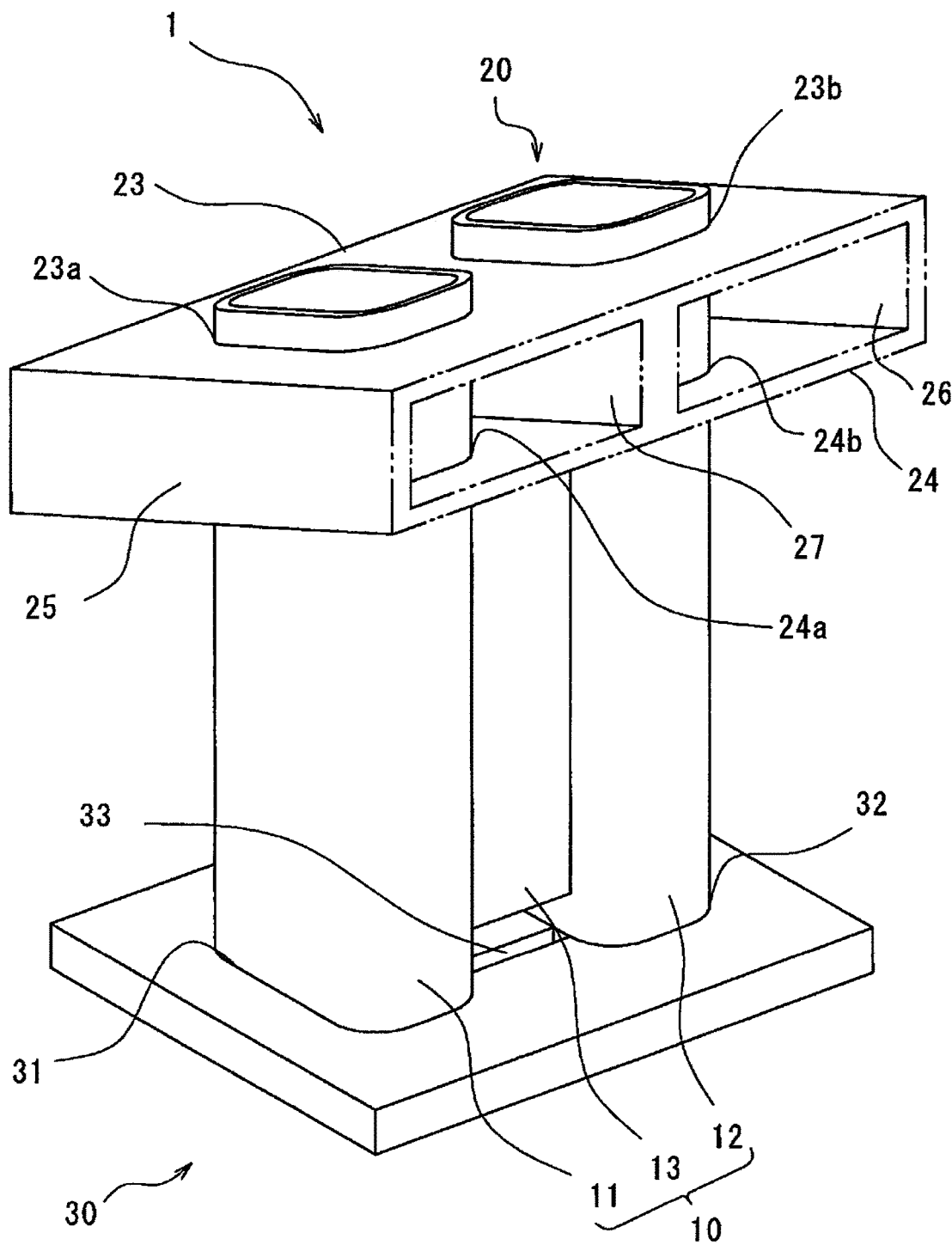
FIG. 4 is a perspective view of a part of a bumper system, which is seen from inside in a width direction of a vehicle.
Figure 5:
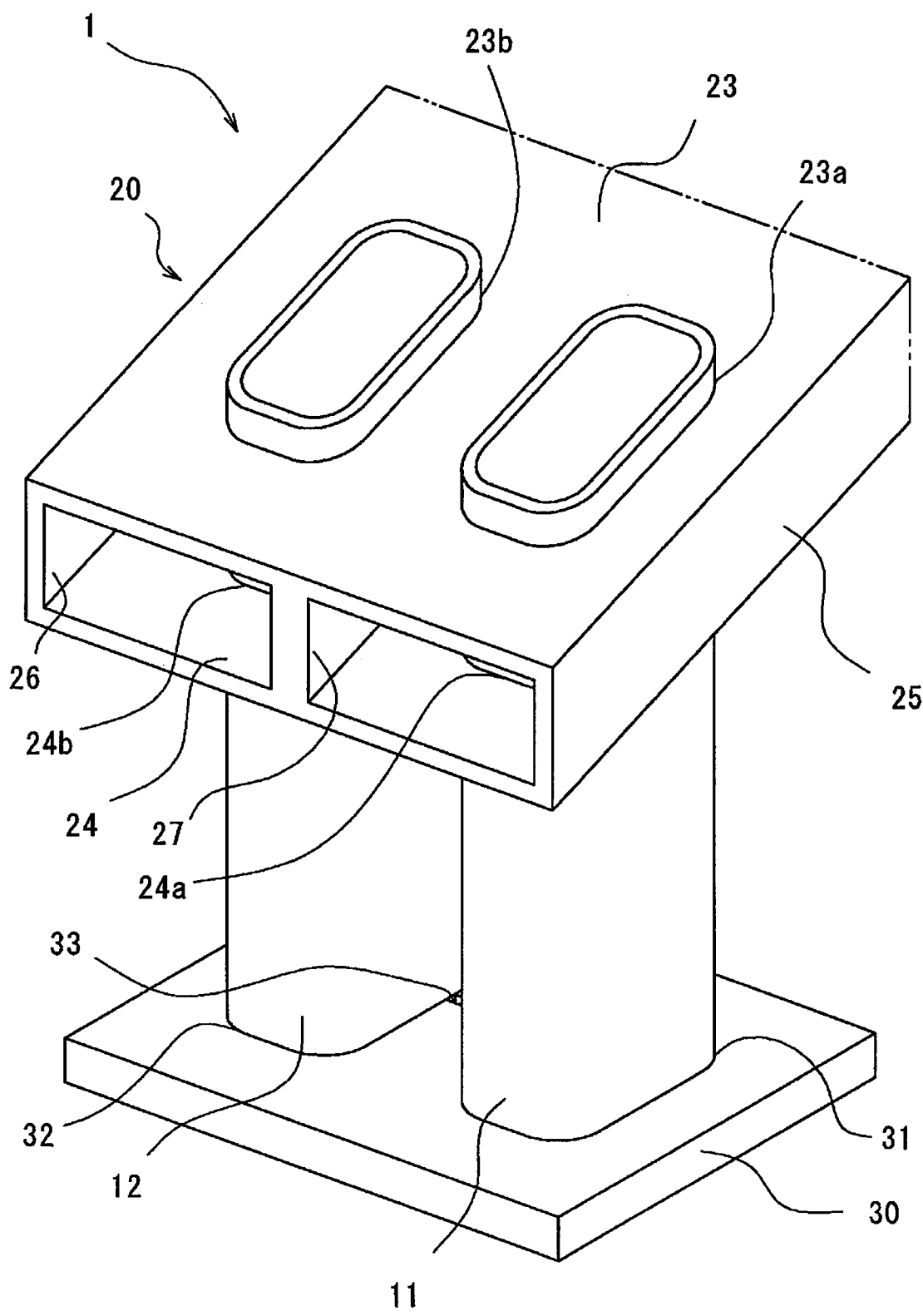
FIG. 5 is a perspective view of a part of a bumper system, which is seen from outside in a width direction of a vehicle.

As shown in FIGS. 1, 4, and 5, the bumper beam 20 is attached at the front of the vehicle to protect a vehicle body (not shown) from impact. The bumper beam 20 includes a front wall 21 placed on a front side when the bumper beam 20 is attached to the vehicle, a rear wall 22 placed on a rear side to face the front wall 21, two forward inclined walls 23 extending from both end portions of the front wall 21 toward the rear side of the vehicle, two rearward inclined walls 24 placed to face the forward inclined walls 23 and extending from both ends of the rear wall 22, and an upper wall 25 and a lower wall 26 that connect those walls at upper and lower positions in the height direction of the vehicle. That is, the bumper beam 20 of this embodiment is a rectangular tube whose both end portions are inclined.

Figure 6:
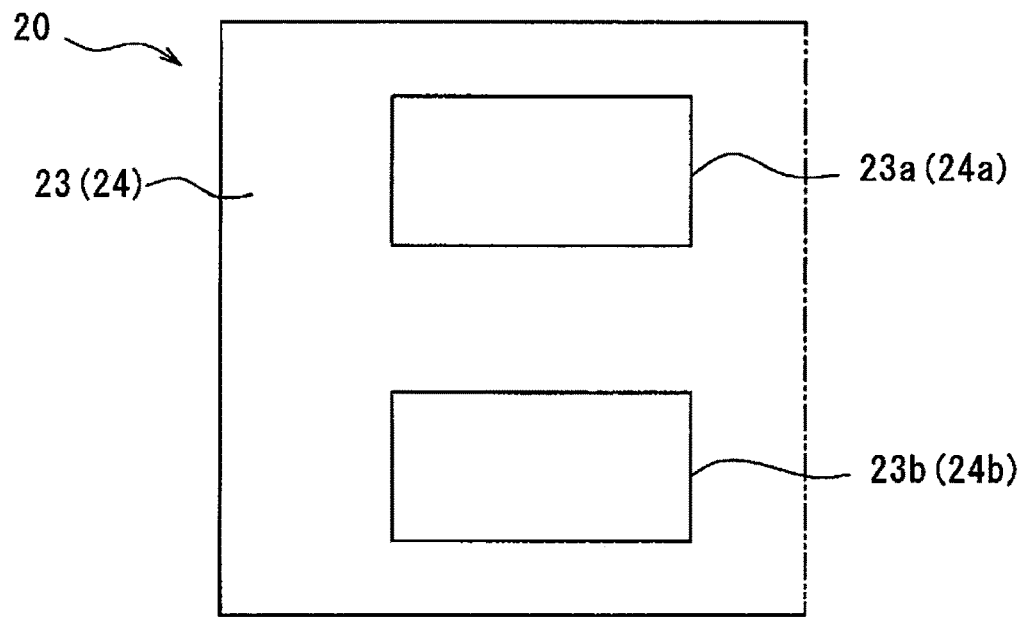
FIG. 6 is a front view of a part of a bumper beam.

FIG. 6 shows a part of the bumper beam 20, which is seen from the front side of the vehicle. As shown in FIG. 6, the forward inclined wall 23 and the rearward inclined wall 24 have first beam holes 23a, 24a into which the first tube 11 of the bumper stay 10 is inserted and second beam holes 23b, 24b into which the second tube 12 is inserted.

In FIG. 6, the forward inclined wall 23 and the rearward inclined wall 24 are shown to coincide with each other. Inner shapes of the first beam holes 23a, 24a and the second beam holes 23b, 24b are substantially similar to outer shapes of the first tube 11 and the second tube 12 of the bumper stay 10, respectively, and are formed to be slightly larger than the outer shapes of the first tube 11 and the second tube 12 of the bumper stay 10.

Further, the bumper beam 20 has a partition wall 27 that partitions an inner space. The partition wall 27 is placed in parallel with the upper wall 25 and the lower wall 26, and connects the front wall 21 and the rear wall 22 and also connects the forward inclined wall 23 and the rearward inclined wall 24.

The bumper beam 20 described above may be an extruded material made from, for example, an aluminum alloy.

The vehicle body plate 30 is a plate-like member that is attached to the vehicle body (not shown) with a bolt or the like (not shown). The vehicle body plate 30 has a first plate hole 31 into which the other end portion of the first tube 11 is insertable and a second plate hole 32 into which the other end portion of the second tube 12 is insertable. Inner shapes of the first plate hole 31 and the second plate hole 32 are substantially similar to outer shapes of the first tube 11 and the second tube 12 of the bumper stay 10, respectively, and are formed to be slightly larger than the outer shapes of the first tube 11 and the second tube 12 of the bumper stay 10.

Figure 7:
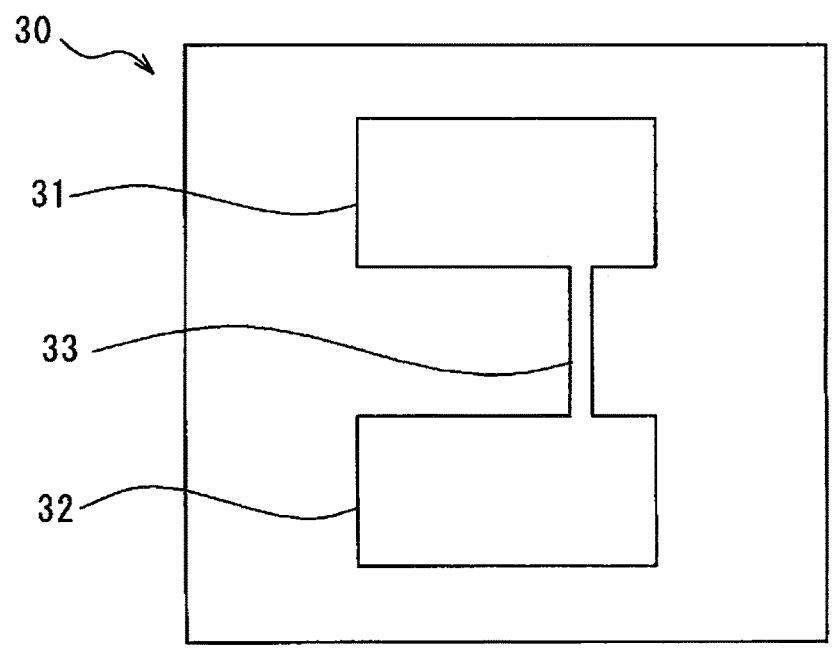
FIG. 7 is a front view of a part of a vehicle body plate.

FIG. 7 shows a part of the vehicle body plate 30, which is seen from the rear side of the vehicle. As shown in FIG. 7, the vehicle body plate 30 of this embodiment has a plate slit 33 that connects the first plate hole 31 and the second plate hole 32 and is cut out in a shape into which the first connection rib 13 is insertable. In this embodiment, the plate slit 33 has a simple linear shape, but the shape is not particularly limited as long as the first connection rib 13 is insertable.

The vehicle body plate 30 described above may be made from, for example, steel.

FIGS. 8A to 8D are schematic views showing a manufacturing process of the bumper system 1. Hereinafter, a method for manufacturing the bumper system 1 will be described with reference to FIGS. 8A to 8D.

Figure 8A:
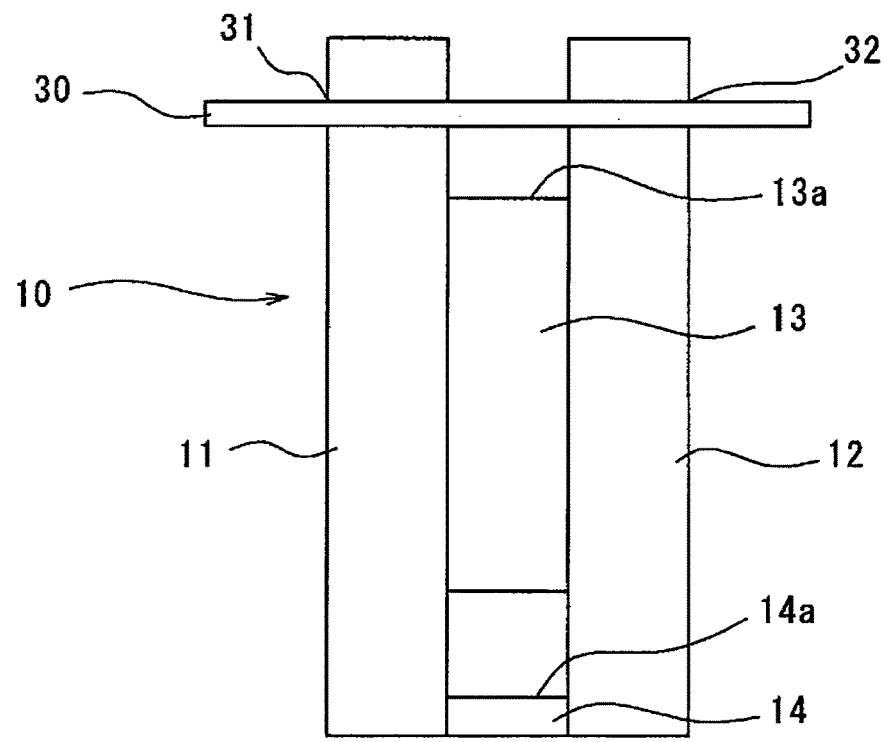
FIG. 8A is a first schematic diagram showing a manufacturing process of a bumper system.
Figure 8B:
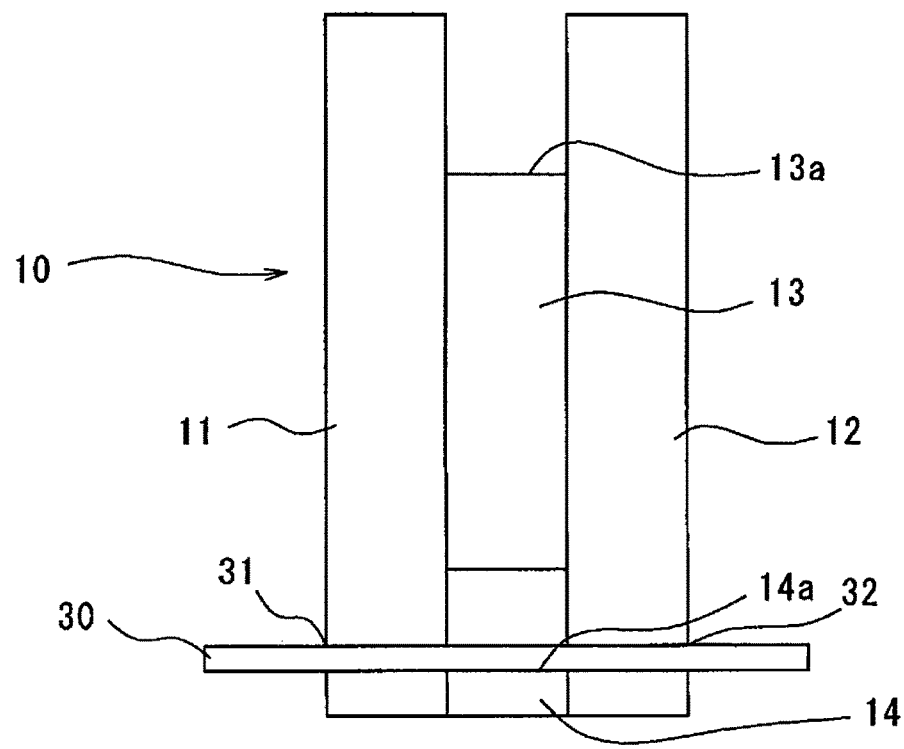
FIG. 8B is a second schematic diagram showing a manufacturing process of a bumper system.
Figure 8C:
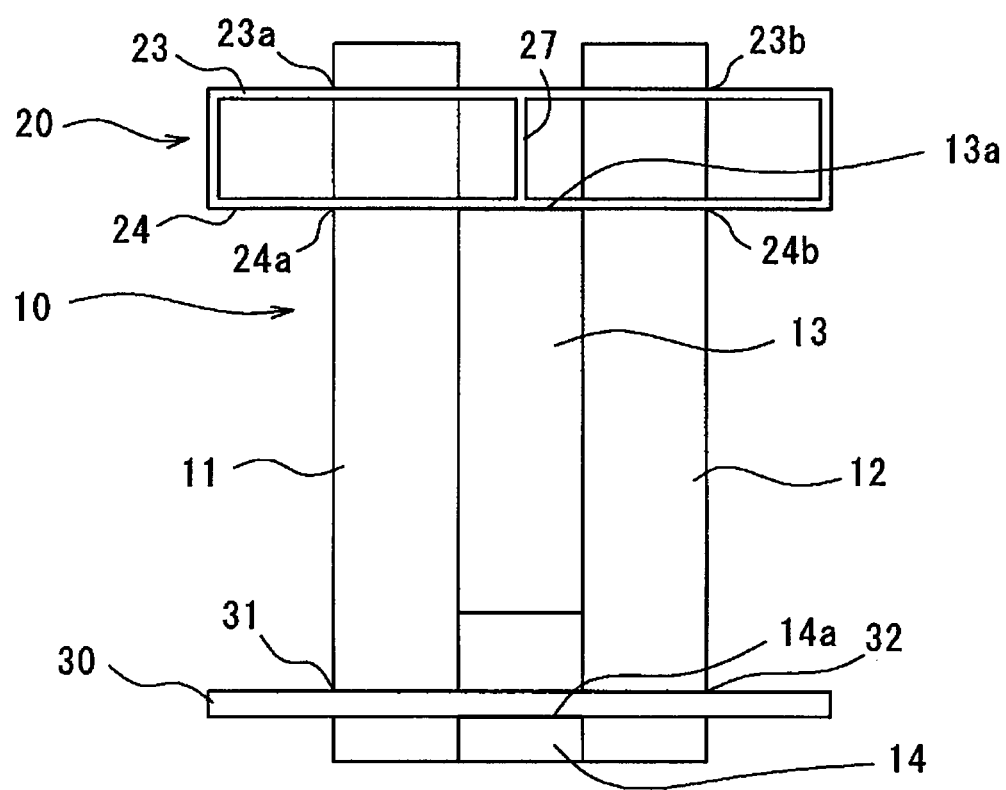
FIG. 8C is a third schematic diagram showing a manufacturing process of a bumper system.
Figure 8D:
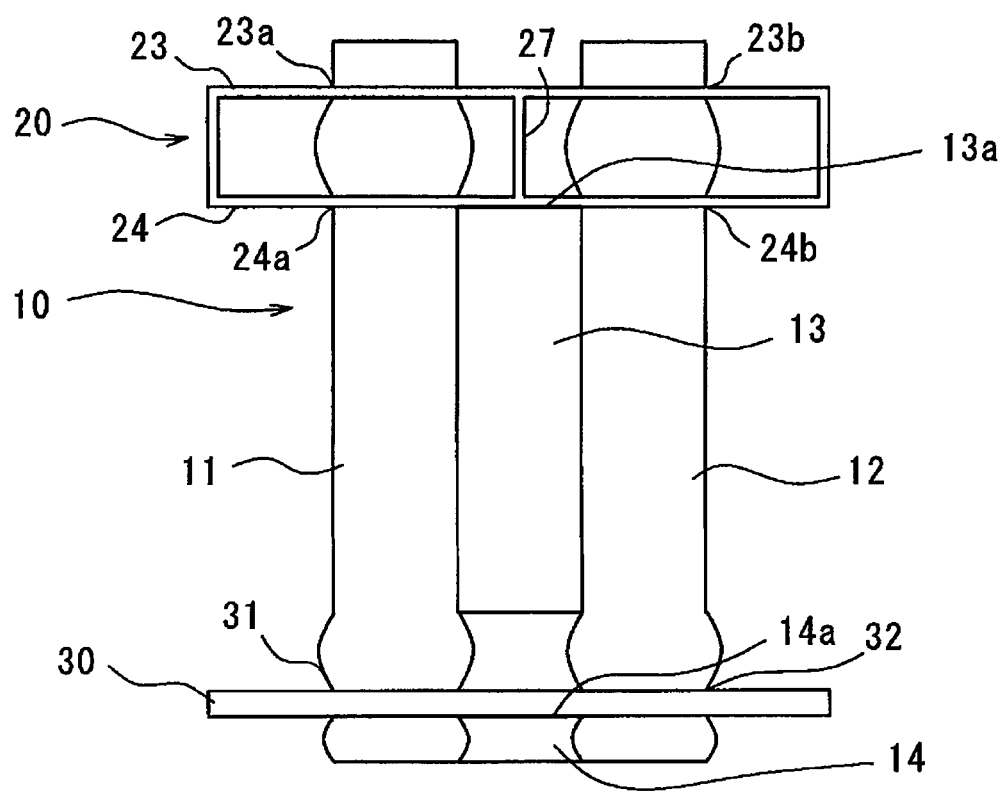
FIG. 8D is a fourth schematic diagram showing a manufacturing process of a bumper system.

When the bumper system 1 is manufactured, as shown in FIG. 8A, first, one end portion of the first tube 11 is inserted into the first plate hole 31, and one end portion of the second tube 12 is inserted into the second plate hole 32. At this time, because the first connection rib 13 provided at the one end portion of the bumper stay 10 can pass through the plate slit 33 (see FIG. 7 and the like), the bumper stay 10 can be inserted into the vehicle body plate 30 to the other end portion thereof. Then, as shown in FIG. 8B, the second connection rib 14 provided at the other end portion of the bumper stay 10 is brought into contact with the vehicle body plate 30. Next, as shown in FIG. 8C, the one end portion of the first tube 11 is inserted into the first beam holes 23a, 24a, and the one end portion of the second tube 12 is inserted into the second beam holes 23b, 24b, and thus the first connection rib 13 is brought into contact with the bumper beam 20. That is, the first connection rib 13 is in contact with the bumper beam 20, and the second connection rib 14 is in contact with the vehicle body plate 30 in the same direction as a direction in which the first connection rib 13 is in contact with the bumper beam 20 in the tube axis direction (Y direction in FIG. 1). In this state, as shown in FIG. 8D, the first tube 11 is expanded at both the first beam holes 23a, 24a and the first plate hole 31, and the second tube 12 is expanded at both the second beam holes 23b, 24b and the second plate hole 32. In this way, the bumper stay 10 is joined to both the bumper beam 20 and the vehicle body plate 30 by press-fitting, and thus the bumper system 1 is manufactured.

A method for expanding the first tube 11 and the second tube 12, which is used when the bumper system 1 is manufactured, is not particularly limited. However, it is preferable to insert elastic bodies such as rubber into the first tube 11 and the second tube 12, respectively, and apply pressure in the tube axis direction to deform the elastic bodies outward in a radial direction of the tube axis, thereby expanding the first tube 11 and the second tube 12 by using the deformation force. This is because this press-fitting joining method using the elastic bodies can easily achieve multi-material joining, regardless of materials of members to be joined. In addition to this method, the first tube 11 and the second tube 12 may be expanded by, for example, electromagnetic forming, hydroforming, machining, or the like.

According to this embodiment, the first connection rib 13 is in contact with the bumper beam 20 at the one end portion of the bumper stay 10, and the second connection rib 14 is in contact with the vehicle body plate 30 at the other end portion of the bumper stay 10. Therefore, the first connection rib 13 and the second connection rib 14 support the bumper stay 10 against a sideways fall. This can prevent the bumper stay 10 from falling sideways. Further, the first connection rib 13 and the second connection rib 14 are in contact with the bumper beam 20 and the vehicle body plate 30, respectively, in the same direction, and therefore serve as a catch when the first tube 11 and the second tube 12 penetrate in the contact direction. In particular, in the bumper system 1, a direction to prevent penetration is generally determined because of a structure thereof. Thus, by providing the catches for preventing penetration in one direction as described above, the penetration can be efficiently prevented. In this way, it is possible to provide the highly safe bumper system 1 that prevents the bumper stay 10 from falling sideways or penetrating and ensures a necessary load resistance.

Further, according to this embodiment, the bumper system 1 can be easily manufactured by providing the plate slit 33, as shown in FIGS. 8A to 8D. In particular, it is unnecessary to perform special processing such as welding, and thus the bumper system 1 can be manufactured at a low cost.

Figure 9:
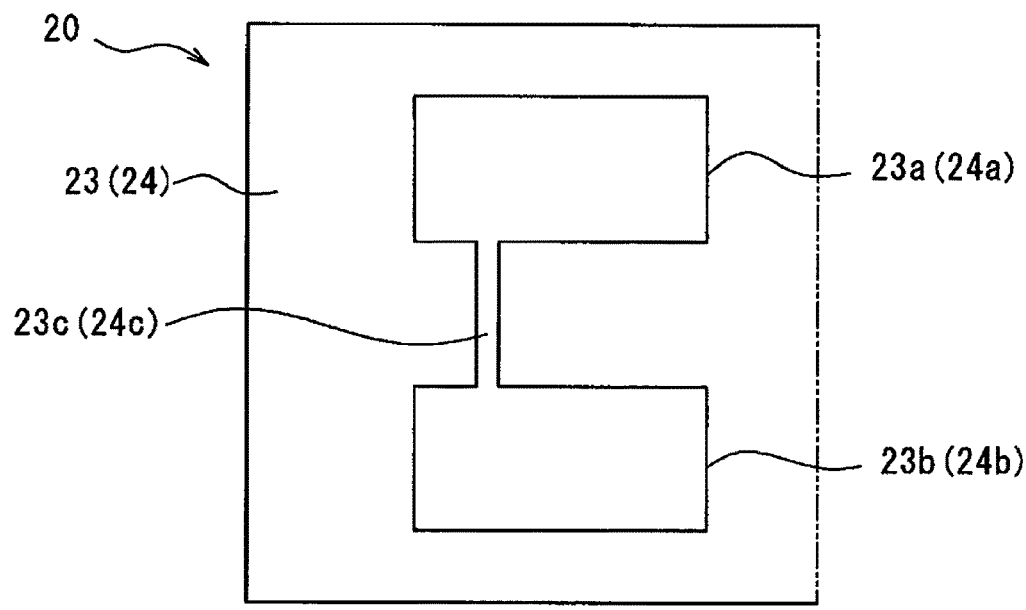
FIG. 9 is a front view of a part of a bumper beam in a modification example of the bumper system according to the first embodiment.
Figure 10:
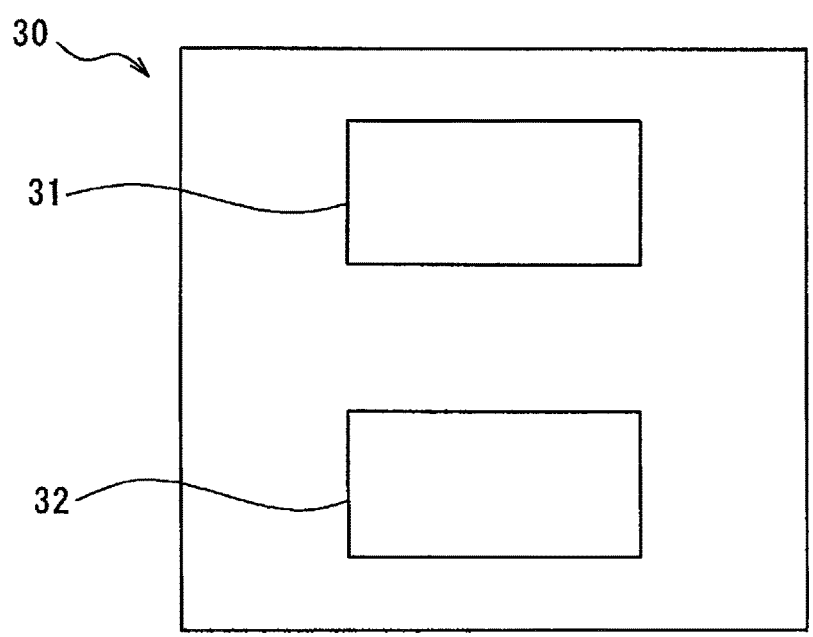
FIG. 10 is a front view of a part of a vehicle body plate in a modification example of the bumper system according to the first embodiment.

FIGS. 9 and 10 correspond to FIGS. 6 and 7 described above, respectively. As shown in FIGS. 9 and 10, as a modification example of this embodiment, beam slits 23c, 24c that connect the first plate hole 31 and the second plate hole 32 and are cut out in a shape into the second connection rib 14 is insertable may be provided in the bumper beam 20, instead of providing the plate slit 33 in the vehicle body plate 30. At this time, the shapes of the first connection rib 13 and the second connection rib 14 and a positional relationship therebetween are substantially interchanged, as compared with those in FIGS. 2 and 3.

FIGS. 11A to 11D are schematic views showing a manufacturing process of the bumper system 1 in this modification example. Hereinafter, a method for manufacturing the bumper system 1 in this modification example will be described with reference to FIGS. 11A to 11D.

Figure 11A:
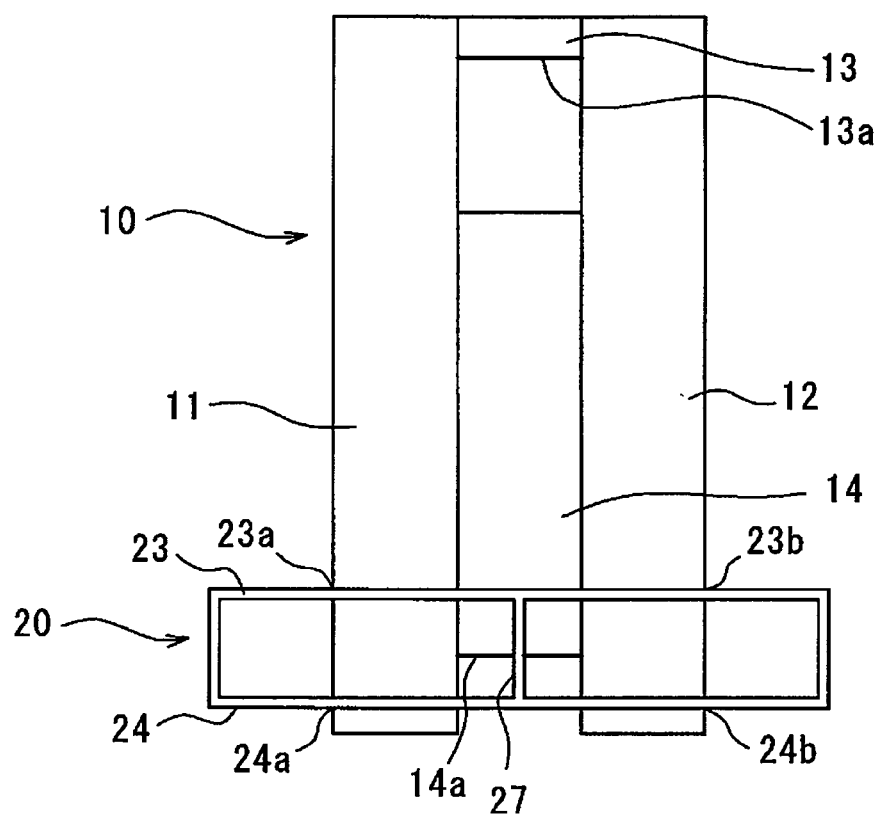
FIG. 11A is a first schematic diagram showing a manufacturing process of a bumper system.
Figure 11B:
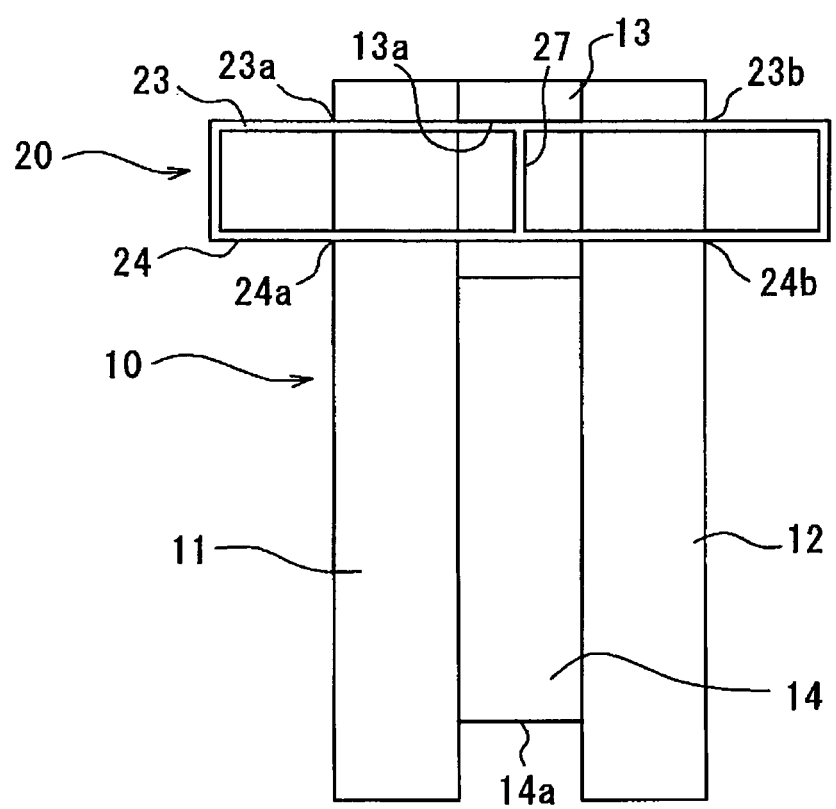
FIG. 11B is a second schematic diagram showing a manufacturing process of a bumper system.
Figure 11C:
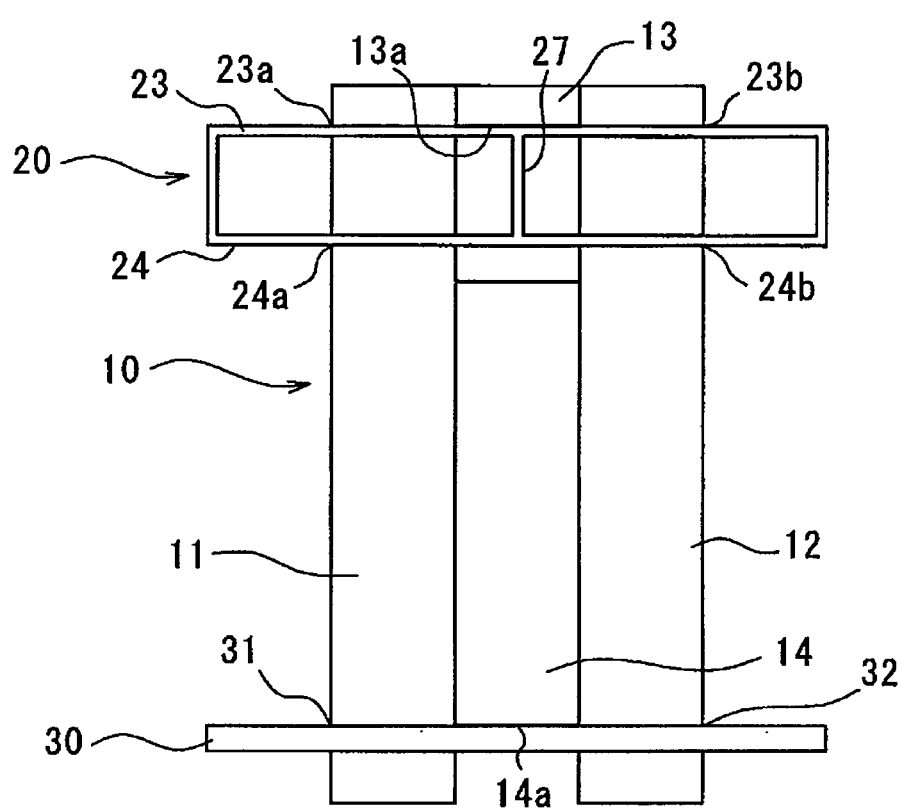
FIG. 11C is a third schematic diagram showing a manufacturing process of a bumper system.
Figure 11D:
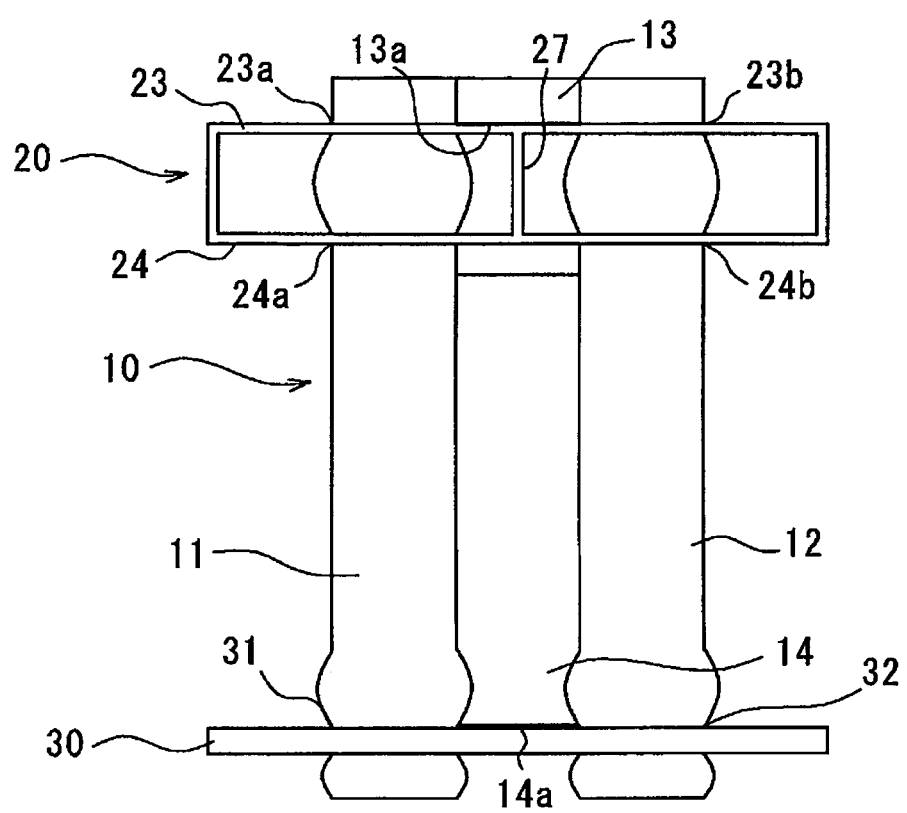
FIG. 11D is a fourth schematic diagram showing a manufacturing process of a bumper system.

In this modification example, when the bumper system 1 is manufactured, as shown in FIG. 11A, first, the other end portion of the first tube 11 is inserted into the first beam holes 23a, 24a, and the other end portion of the second tube 12 is inserted into the second beam holes 23b, 24b. At this time, because the second connection rib 14 provided at the other end portion of the bumper stay 10 can pass through the beam slits 23c, 24c, the bumper stay 10 can be inserted into the bumper beam 20 to the one end portion thereof. Then, as shown in FIG. 11B, the first connection rib 13 provided at the one end portion of the bumper stay 10 is brought into contact with the bumper beam 20. Next, as shown in FIG. 11C, the other end portion of the first tube 11 is inserted into the first plate hole 31, and the other end portion of the second tube 12 is inserted into the second plate hole 32, and thus the second connection rib 14 is brought into contact with the vehicle body plate 30. That is, the first connection rib 13 is in contact with the bumper beam 20, and the second connection rib 14 is in contact with the vehicle body plate 30 in the same direction as a direction in which the first connection rib 13 is in contact with the bumper beam 20 in the tube axis direction (Y direction in FIG. 1). In this state, as shown in FIG. 11D, the first tube 11 is expanded at both the first beam holes 23a, 24a and the first plate hole 31, and the second tube 12 is expanded at both the second beam holes 23b, 24b and the second plate hole 32. In this way, the bumper stay 10 is joined to both the bumper beam 20 and the vehicle body plate 30 by press-fitting, and thus the bumper system 1 is manufactured.

According to this embodiment, the bumper system 1 can be easily manufactured by providing the beam slits 23c, 24c, as shown in FIGS. 11A to 11D.

In particular, it is unnecessary to perform special processing such as welding, and thus the bumper system 1 can be manufactured at a low cost.

Figure 12:
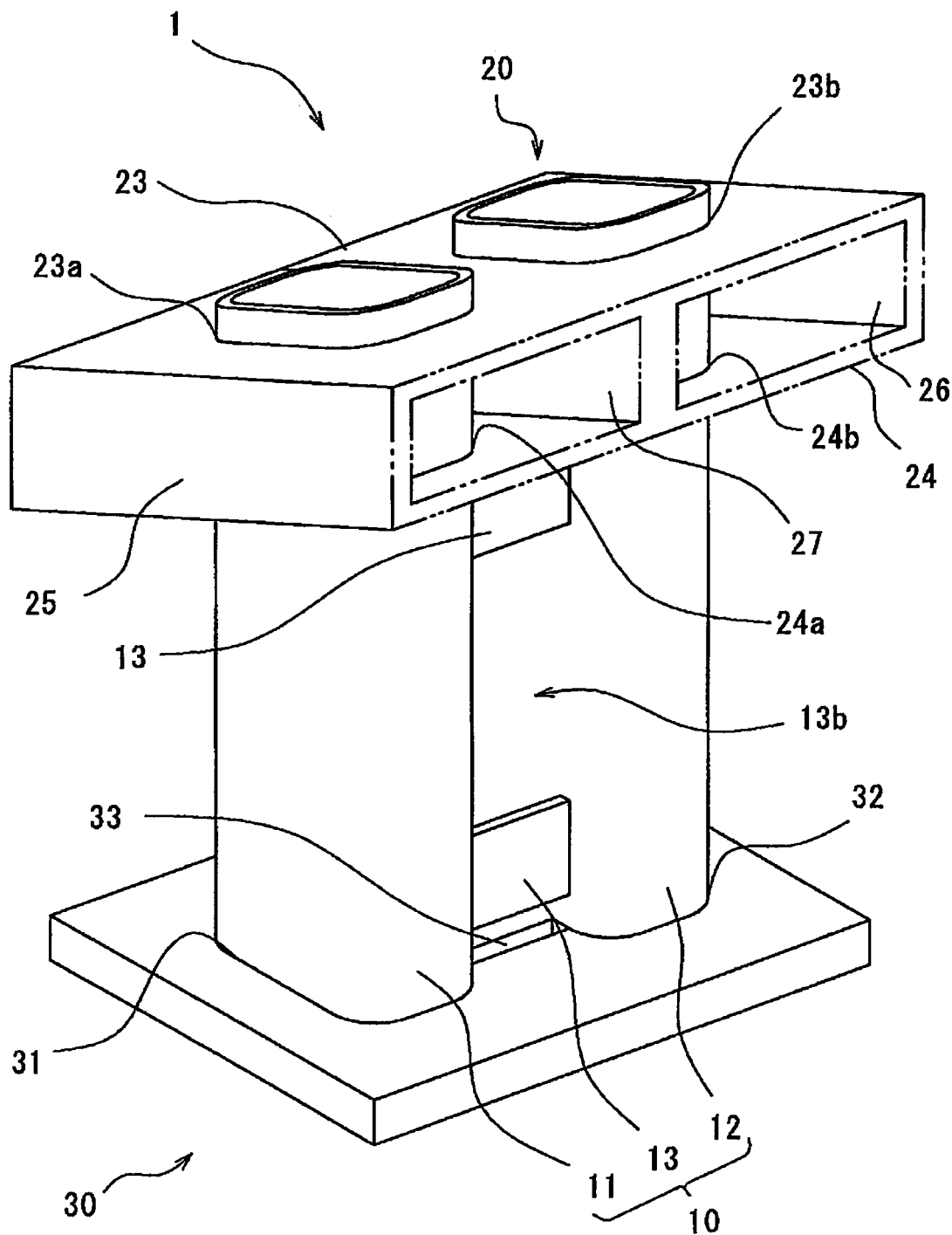
FIG. 12 is a perspective view of another modification example of the bumper system according to the first embodiment, which is seen from inside in a width direction of a vehicle.
Figure 13:
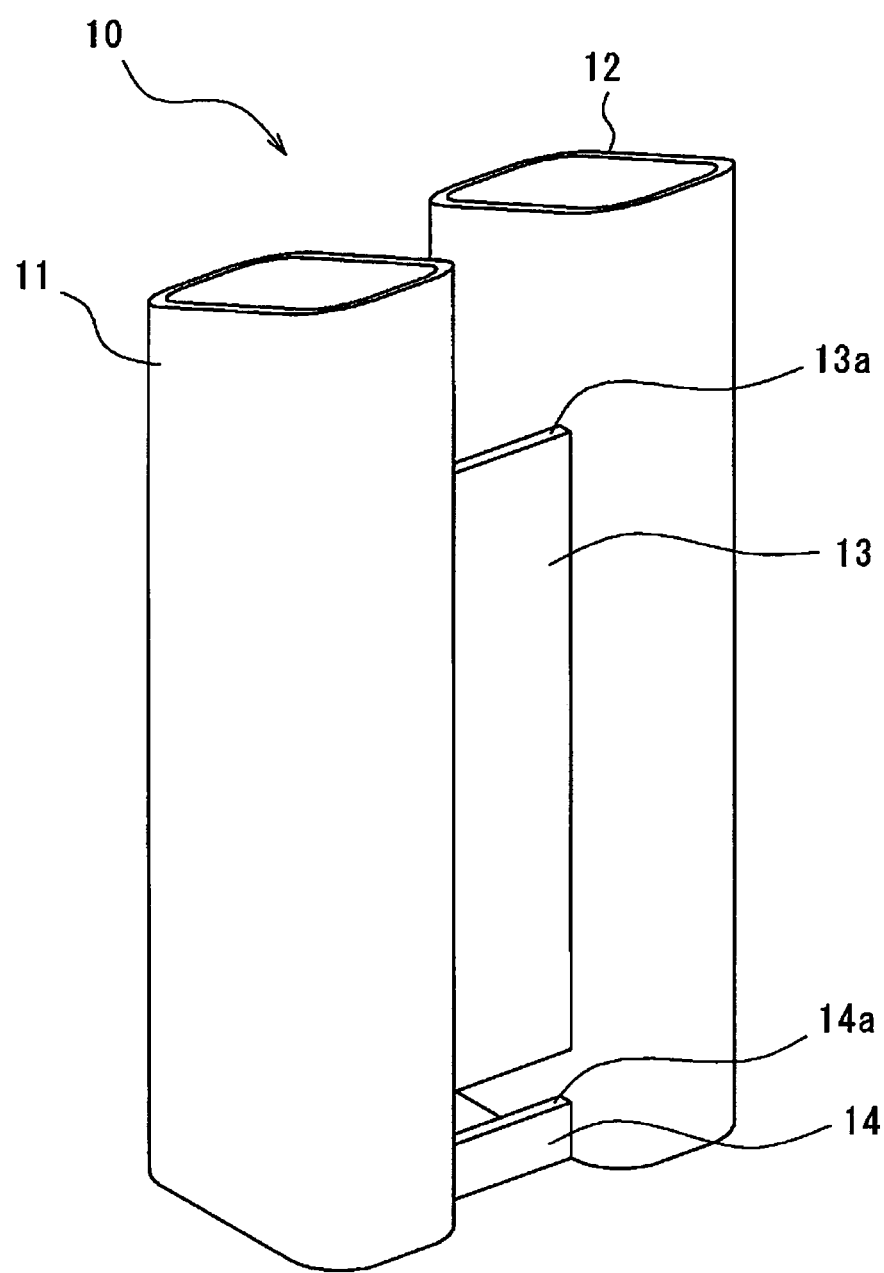
FIG. 13 is a perspective view of a bumper system according to a second embodiment, which is seen from inside in a width direction of a vehicle.
Figure 14:
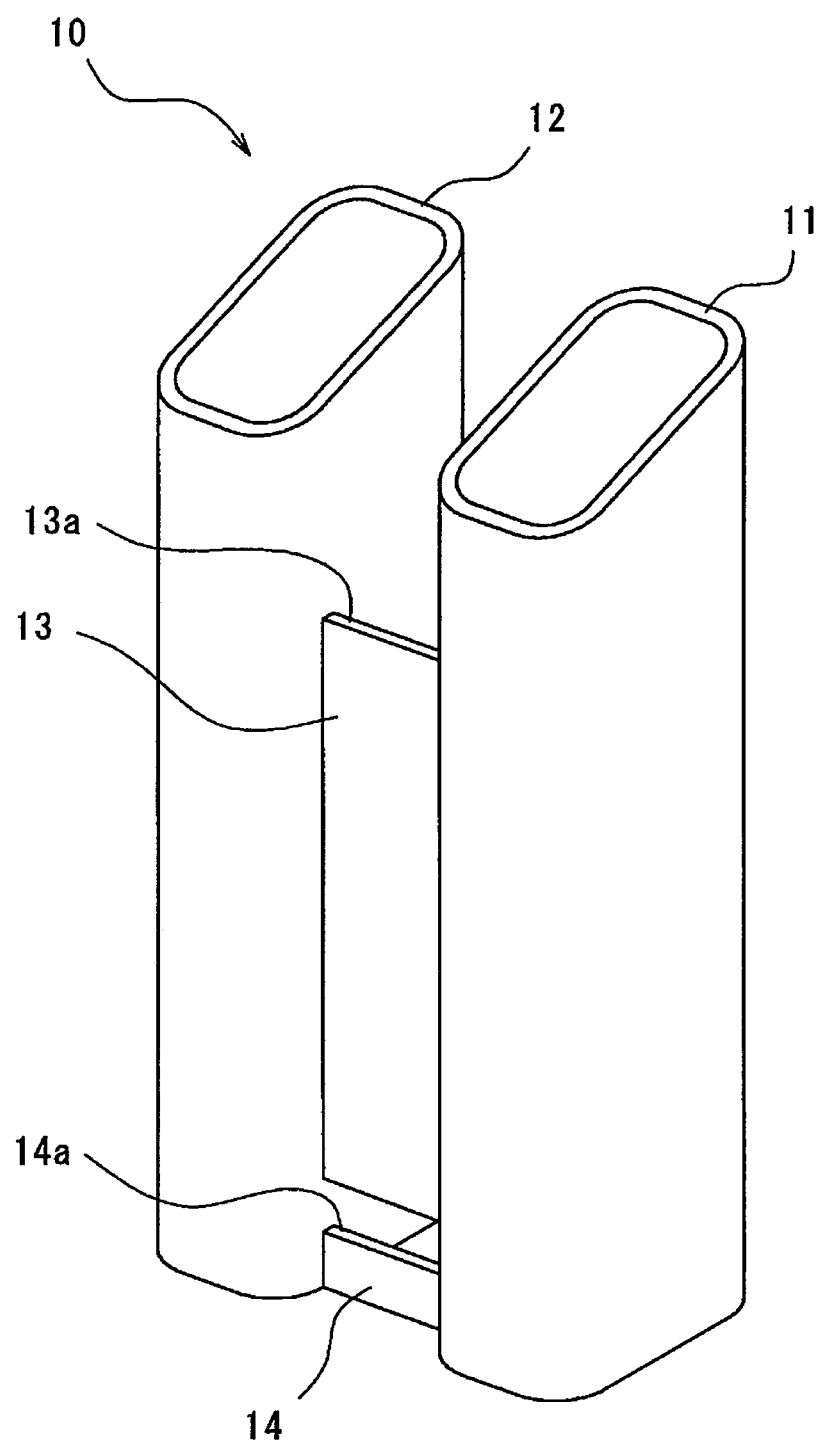
FIG. 14 is a perspective view of a bumper system according to the second embodiment, which is seen from outside in a width direction of a vehicle.

Further, as shown in FIG. 12, as another modification example of this embodiment, a cutout portion 13b obtained by cutting out a part of the first connection rib 13 may be provided. By providing the cutout portion 13b, the weight can be reduced.

Second Embodiment

The shape of the second connection rib 14 is different in the bumper system 1 according to a second embodiment shown in FIGS. 13 to 18. A configuration other than the shape thereof is the same as the configuration of the bumper system 1 according to the first embodiment shown in FIGS. 1 to 7. Therefore, the same parts as those in the first embodiment may be denoted by the same reference signs, and description thereof may be omitted.

In this embodiment, neither the plate slit 33 or the beam slits 23c, 24c are provided, unlike the first embodiment and the modification example thereof. Instead, as described below, the second connection rib 14 is connected to the first tube 11 and the second tube 12 by welding.

The first connection rib 13 of the bumper stay 10 is a plate-like portion extending in the longitudinal direction of the vehicle (Y direction in FIG. 1), as in the first embodiment. The first connection rib 13 is provided from the one end portion to the other end portion of the bumper stay 10, but is not provided at both the ends of the bumper stay 10. That is, the first connection rib 13 is provided at the center of the bumper stay 10 in the longitudinal direction of the vehicle (Y direction in FIG. 1). In particular, in this embodiment, unlike the first embodiment, first connection ribs 13 are provided on inner and outer sides, respectively, in the width direction of the vehicle (X direction in FIG. 1). Thus, in this embodiment, two stop surfaces 13a that are flush with each other are formed.

As in the first embodiment, the second connection rib 14 is a plate-like portion extending in the longitudinal direction of the vehicle (Y direction in FIG. 1). The second connection ribs 14 are provided at the same position as the two first connection ribs 13 in the width direction of the vehicle (X direction in FIG. 1). That is, the second connection ribs 14 are provided on extended lines of the first connection ribs 13 in the longitudinal direction of the vehicle (Y direction in FIG. 1). Thus, in this embodiment, two stop surfaces 14a that are flush with each other are formed. A gap is provided between the first connection ribs 13 and the second connection ribs 14 in the longitudinal direction of the vehicle (Y direction in FIG. 1), and the size of this gap is substantially the same as the thickness of the vehicle body plate 30.

Figure 15:
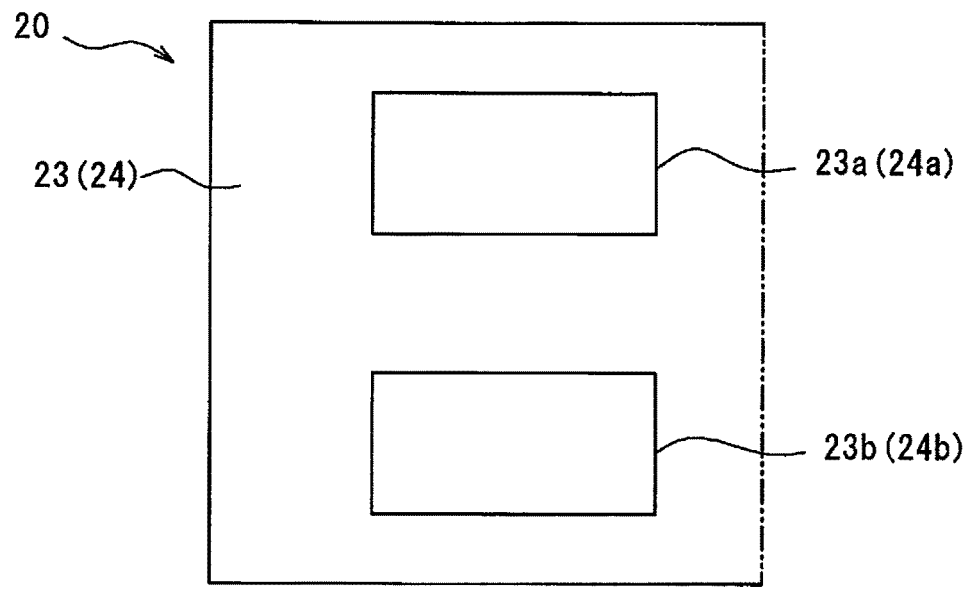
FIG. 15 is a front view of a part of a bumper beam.

As shown in FIG. 15, the shape of the bumper beam 20 is the same as that in the first embodiment.

Figure 16:
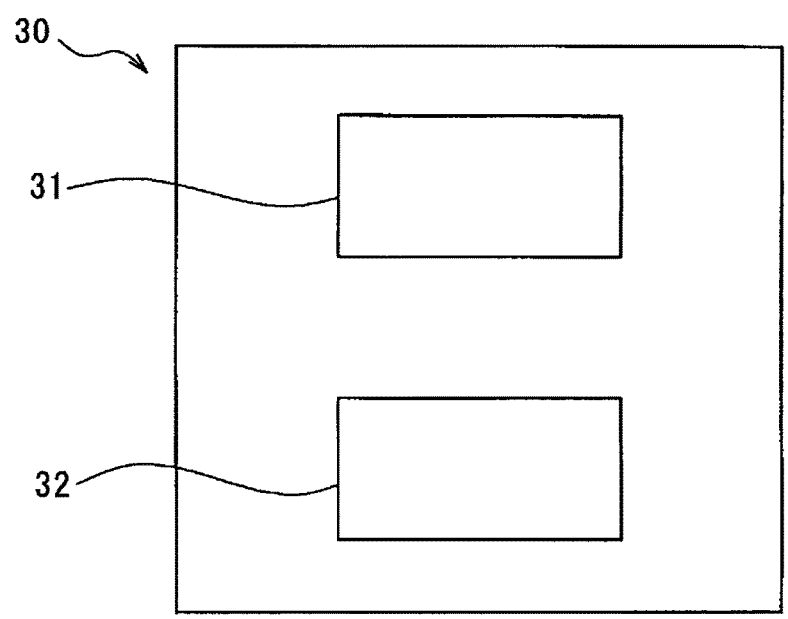
FIG. 16 is a front view of a part of a vehicle body plate.

As shown in FIG. 16, the shape of the vehicle body plate 30 is the same as that in the first embodiment, except that the plate slit 33 is not provided.

Figure 17:
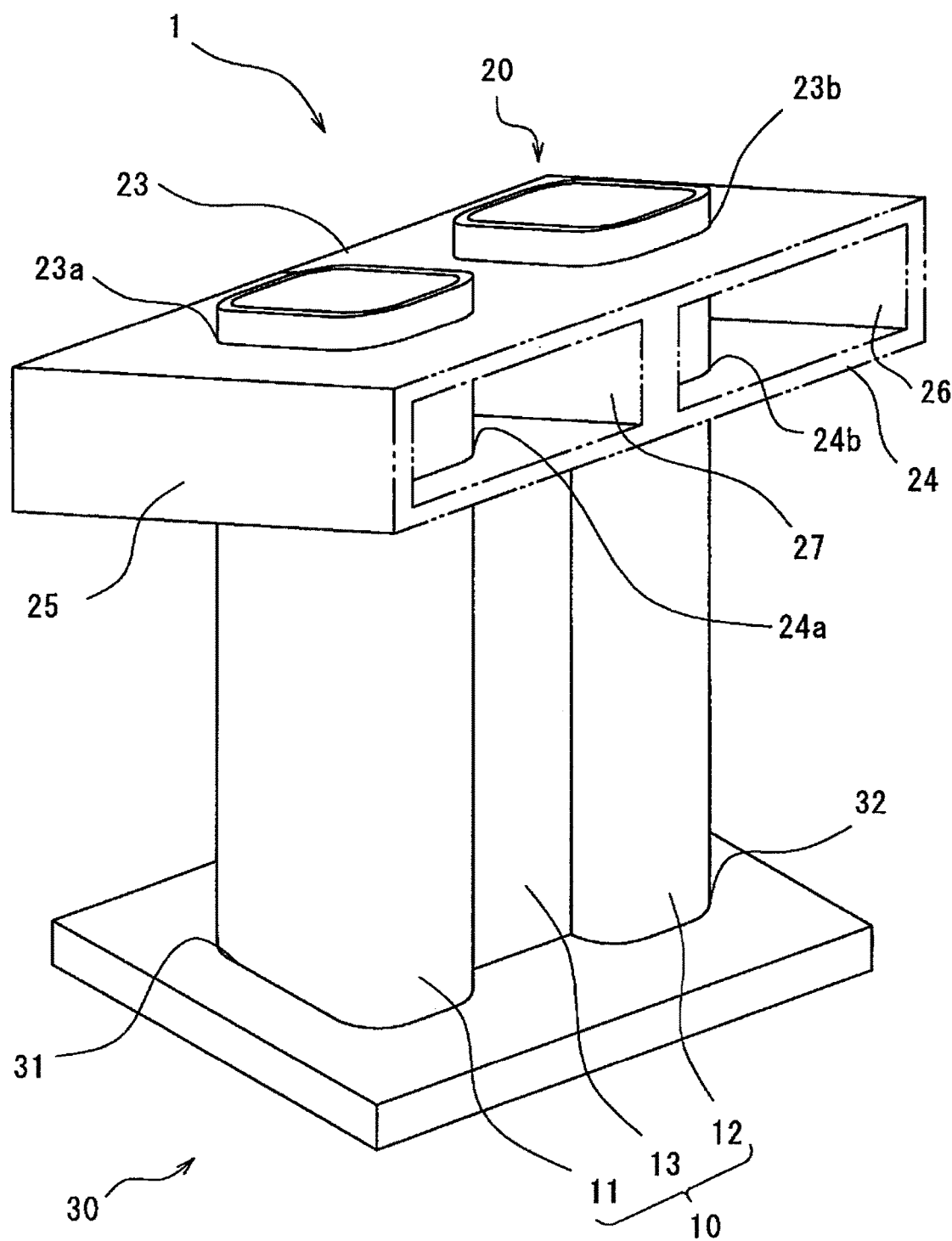
FIG. 17 is a perspective view of a bumper stay, which is seen from inside in a width direction of a vehicle.
Figure 18:
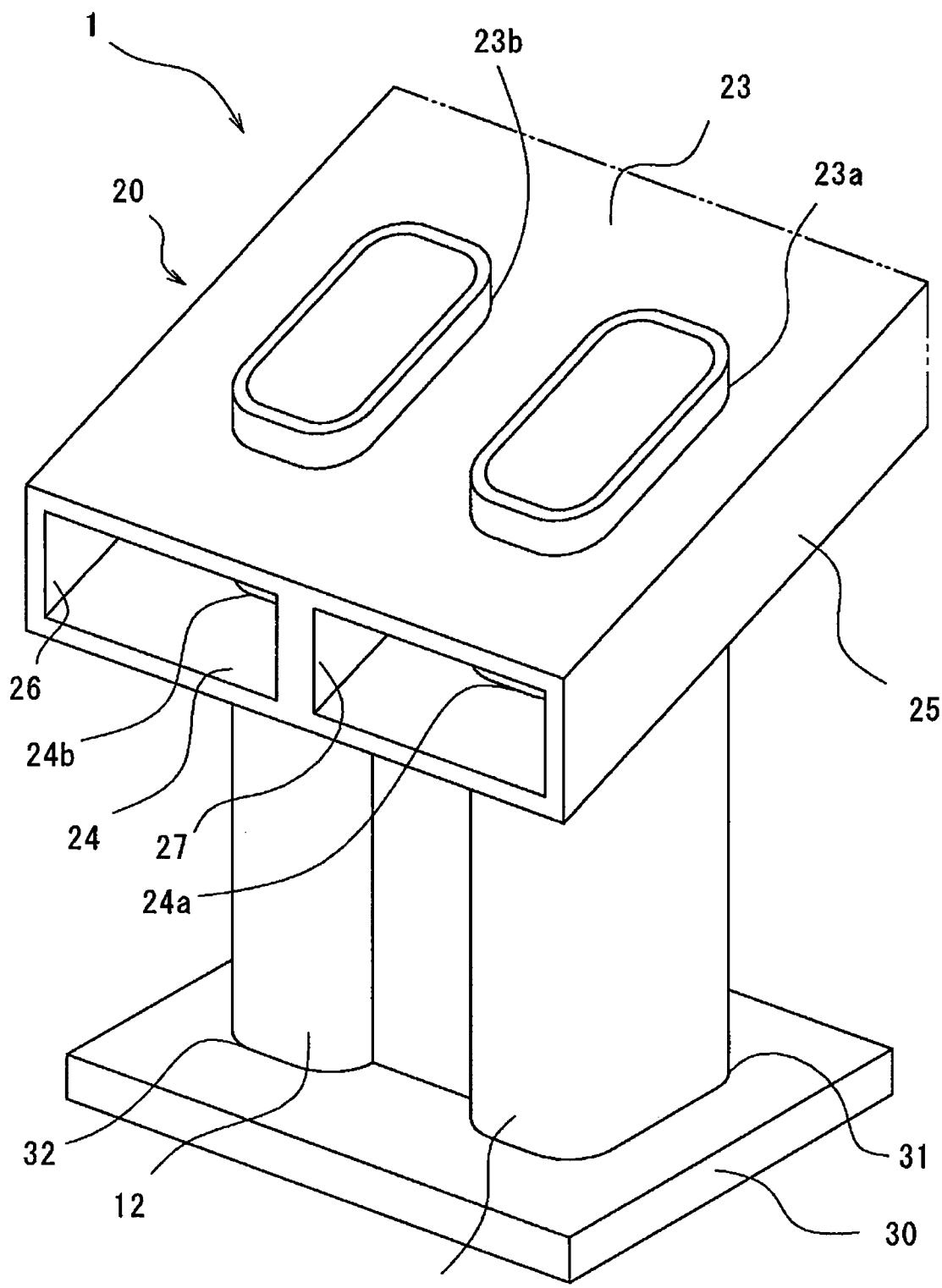
FIG. 18 is a perspective view of a bumper stay, which is seen from outside in a width direction of a vehicle.

As shown in FIGS. 17 and 18, when the bumper system 1 is manufactured, first, the one end portions of the first tube 11 and the second tube 12 of the bumper stay 10 are inserted into the first beam holes 23a, 24a and the second beam holes 23b, 24b of the bumper beam 20, respectively, in a state in which the second connection rib 14 is not provided in the bumper stay 10. Then, the bumper beam 20 is brought into contact with the first connection ribs 13. Next, the other end portions of the first tube 11 and the second tube 12 of the bumper stay 10 are inserted into the first plate hole 31 and the second plate hole 32 of the vehicle body plate 30. In this state, the second connection ribs 14 are attached to the first tube 11 and the second tube 12 by welding. The second connection ribs 14 are in contact with the vehicle body plate 30 in the attached state. That is, the first connection ribs 13 are in contact with the bumper beam 20, and the second connection ribs 14 are in contact with the vehicle body plate 30 in the same direction as a direction in which the first connection ribs 13 are in contact with the bumper beam 20 in the tube axis direction (Y direction in FIG. 1). Thereafter, the first tube 11 is expanded at both the first beam holes 23a, 24a and the first plate hole 31, and the second tube 12 is expanded at both the second beam holes 23b, 24b and the second plate hole 32. In this way, the bumper stay 10 is joined to the bumper beam 20 and the vehicle body plate 30 by press-fitting, and thus the bumper system 1 is manufactured.

According to this embodiment, the first connection ribs 13 or the second connection ribs 14 can be additionally formed by welding after the bumper system 1 is assembled. This can improve the degree of freedom in assembly. Instead of the second connection ribs 14, the first connection ribs 13 may be connected to the first tube 11 and the second tube 12 by welding.

Hereinabove, specific embodiments of the present invention and modification examples thereof have been described. However, the present invention is not limited to the above embodiments, and can be variously changed within the scope of the present invention. For example, an appropriate combination of contents of the individual embodiments and contents of the modification examples may be implemented as an embodiment of the present invention.

The invention claimed is:

1. A bumper system, comprising:
a bumper stay in which a first tube and a second tube extending in the same direction are connected by a first connection rib provided at least at one end portion and a second connection rib provided at least at the other end portion;
a bumper beam having a first beam hole into which one end portion of the first tube is insertable and a second beam hole into which one end portion of the second tube is insertable; and
a vehicle body plate having a first plate hole into which the other end portion of the first tube is insertable and a second plate hole into which the other end portion of the second tube is insertable, wherein:
the bumper system is a system in which the bumper stay and the bumper beam are joined and the bumper stay and the vehicle body plate are joined;
the one end portion of the first tube is inserted into the first beam hole, the other end portion of the first tube is inserted into the first plate hole, the one end portion of the second tube is inserted into the second beam hole, and the other end portion of the second tube is inserted into the second plate hole;
the bumper stay is joined to both the bumper beam and the vehicle body plate by press-fitting in a state in which the first tube is expanded at both the first beam hole and the first plate hole and the second tube is expanded at both the second beam hole and the second plate hole; and
the first connection rib is in contact with the bumper beam, and the second connection rib is in contact with the vehicle body plate in the same direction as a direction in which the first connection rib is in contact with the bumper beam in a direction in which the first tube and the second tube extend.

2. The bumper system according to claim 1, wherein the vehicle body plate includes a plate slit that connects the first plate hole and the second plate hole and is cut out in a shape into which the first connection rib is insertable.

3. The bumper system according to claim 1, wherein the bumper beam includes a beam slit that connects the first beam hole and the second beam hole and is cut out in a shape into which the second connection rib is insertable.

4. The bumper system according to claim 1, wherein at least one of the first connection rib and the second connection rib is connected to the first tube and the second tube by welding.

5. The bumper system according to claim 2, wherein at least one of the first connection rib and the second connection rib is connected to the first tube and the second tube by welding.

6. The bumper system according to claim 3, wherein at least one of the first connection rib and the second connection rib is connected to the first tube and the second tube by welding.

* * * * *